(12) United States Patent
Brockschnieder et al.

(10) Patent No.: US 8,328,277 B2
(45) Date of Patent: Dec. 11, 2012

(54) SLIDE FASTENER ELEMENT, CUSHION ARRANGEMENT AND VEHICLE SEAT

(75) Inventors: Dagmar Brockschnieder, Rietberg (DE); Silvia Krömer, Pollhagen (DE); Christian Neyrinck, Stadthagen (DE)

(73) Assignee: Faurecia Autositze GmbH (DE)

( * ) Notice: Subject to any disclaimer, the term of this patent is extended or adjusted under 35 U.S.C. 154(b) by 69 days.

(21) Appl. No.: 12/685,101

(22) Filed: Jan. 11, 2010

(65) Prior Publication Data

US 2010/0176647 A1   Jul. 15, 2010

(30) Foreign Application Priority Data

Jan. 10, 2009   (DE) .......................... 10 2009 004 321

(51) Int. Cl.
*A47C 31/02* (2006.01)
(52) U.S. Cl. ................................ 297/218.2; 297/228.13
(58) Field of Classification Search ............... 297/218.2, 297/218.1, 228.13, 452.6, 452.59, DIG. 1, 297/DIG. 2; 24/387, 434, 381; 403/404; 29/91.1, 91; 264/45.1

See application file for complete search history.

(56) References Cited

U.S. PATENT DOCUMENTS

| | | | | |
|---|---|---|---|---|
| 3,619,879 A | * | 11/1971 | Shirakawa | ................... 29/91.1 |
| 3,961,823 A | * | 6/1976 | Caudill, Jr. | ................. 297/452.6 |
| 4,488,337 A | * | 12/1984 | Yoshida et al. | ................. 24/381 |
| 5,588,187 A | * | 12/1996 | Swain | ........................ 24/581.11 |
| 6,955,465 B2 | * | 10/2005 | Machacek et al. | ............. 383/63 |
| 7,390,059 B2 | | 6/2008 | Brockschnieder et al. | |
| 7,506,939 B2 | | 3/2009 | Brockschneider et al. | |
| 2007/0069559 A1 | * | 3/2007 | Poulakis | .................... 297/218.2 |

FOREIGN PATENT DOCUMENTS

| | | | |
|---|---|---|---|
| DE | 29917372 U1 | * | 1/2000 |
| DE | 19846795 | | 4/2000 |
| FR | 2911821 | | 8/2008 |
| WO | WO 01/24665 | | 4/2001 |

* cited by examiner

*Primary Examiner* — Milton Nelson, Jr.
(74) *Attorney, Agent, or Firm* — Robert Becker; Becker & Stachniak, P.C.

(57) ABSTRACT

A slide fastener element, cushion arrangement, vehicle seat or interior covering part. The slide fastener element includes a flexible, foamable lattice that is provided with a plurality of holes, and a plurality of slide fastener teeth secured directly to the lattice.

7 Claims, 2 Drawing Sheets

SLIDE FASTENER ELEMENT, CUSHION ARRANGEMENT AND VEHICLE SEAT

The instant application should be granted the priority date of Jan. 10, 2009 the filing date of the corresponding German patent application 10 2009 004 321.7.

BACKGROUND OF THE INVENTION

The present invention relates to a slide fastener element, a cushion arrangement having a slide fastener element, and a vehicle seat or an interior covering part, which includes a slide fastener element and/or a cushion arrangement.

Cushion arrangements which are provided with a cushion and a covering that at least partially covers the cushion, and whereby the cover is held on the cushion by means of a fastening device, are known in principle.

For example, DE 10 2005 012 320 A1 discloses a cushion arrangement having a foam cushion and a two-part covering, whereby the two-part covering is connected with the cushion via a glide closure in a detachment channel of the cushion. The glide closure includes a glide closure element that is anchored in the cushion by means of barbs. The glide closure furthermore includes a glide closure counter element, which is sewn to the covering. Glide closure element and glide closure counter element are provided with cooperating registering bodies, which with the aid of a slider can be brought into engagement with one another. However, the drawback of such a fastening device is that the materials used for the glide closure, in order to enable closing, are relatively soft or weak. The danger exists that the securement effected by the glide closure can loosen from the covering on the cushion by frequent and constant loading.

DE 198 46 795 A1 discloses a cushion arrangement having a covering and a cushion, whereby the cover is interconnected via holding strips and clamps, which on the one hand embrace the holding strips and on the other hand embrace a cable strand of a mesh that is foamed in the cushion.

DE 10 2005 013 613 A1 discloses a cushion arrangement having a cushion and a cover, whereby the cover is secured to the cushion via a fastener, which includes a fastener element and a fastener counter element. The fastener counter element is sewn with the covering, and the fastener element is foamed in the cushion. No details regarding the construction of the fastener are disclosed.

EP 1 220 628 B1 discloses a cushion arrangement having a cover and a cushion, whereby the cover is connected with the cushion via a clip closure, which is provided with a clip strip secured to the cover and a clip element connected to the cushion. The clip element of the cushion is connected with a fabric or mesh, for example by gluing or fusing, and which extends beyond the clip element. The mesh is foamed in the cushion and in this manner anchors the clip element to the cushion.

FR 2 911 821 A1 discloses a cushion arrangement having a cushion and a cover, whereby the cover is connected to the cushion by a zipper. A zipper element of the zipper has a textile carrier band that is foamed in the cushion and in this manner fixes the zipper element in the cushion. A zipper counter element of the zipper is connected to the cover.

It is an object of the present invention to provide a slide fastener element for a slide fastener that is economical to produce and that can be reliably held by a foam cushion. A further object of the invention is to provide a cushion arrangement having such a slide fastener element, as well as a vehicle seat or an interior covering part having such a slide fastener element or such a cushion arrangement.

BRIEF DESCRIPTION OF THE DRAWINGS

These and other objects and advantages of the invention will be described in detail subsequently with the aid of the accompanying schematic drawings, in which.

SUMMARY OF THE INVENTION

Figure 1:
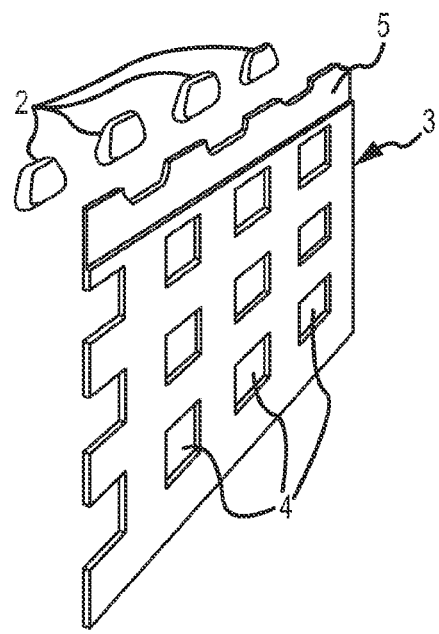
FIG. 1 is an exploded perspective view of one exemplary embodiment of an inventive slide fastener element.

The inventive slide fastener element includes a plurality of slide fastener teeth and a foamable lattice, i.e. a lattice that is adapted to receive foam, wherein the lattice is a flexible lattice having a plurality of holes, and wherein the slide fastener teeth are secured directly to the lattice.

The inventive cushion arrangement includes a cushion and such a slide fastener element, wherein the lattice is anchored in the cushion.

Due to its plurality of holes, the lattice permits a reliable anchoring in the cushion, in particular where the cushion is a foam cushion and the lattice is foamed in the cushion. The flexibility of the lattice enables a certain amount of freedom of movement of the in themselves hard and inflexible slide fastener teeth, which is advantageous for a guidance of a cover secured to the cushion via the slide fastener element, for example where the path of the slide fastener element/cover is curved. Due to the fact that the slide fastener teeth are secured directly to the lattice, the slide fastener element can be economically manufactured. In particular, it is possible to eliminate a textile band, on which the teeth of a conventional zipper are secured. In contrast, the inventive slide fastener element can comprise, which is preferable, merely a flexible lattice and the slide fastener teeth that are secured thereon.

The slide fastener teeth are preferably extruded onto the lattice. However, other types of securement are also possible, for example a securement via a welding or fusing process, via weaving, being sewn in, clamping and similar mechanical methods. In particular, the slide fastener teeth can alternatively also be formed by a spiral-shaped element, whereby the helical element, in particular a helically bent wire, is secured to the lattice.

Within the context of the present application, "lattice" means a flat or sheet-like flexible element having holes. The lattice can, for example, be formed from a textile and/or a foil or thin sheet.

The inventive slide fastener element can be provided on widely varying components of a securement device, whereby these components are not limited to cushions, but rather, for example, can also include any desired interior covering elements of vehicles, for example door coverings, front coverings, or luggage compartment coverings. In addition to a securement of covers, the slide fastener element can also, for example, be used for the securement of other objects, such as mirrors, side pockets or the like.

Further specific features of the present application will be described in detail subsequently.

Description Of Specific Embodiments

The same components, or components that correspond to one another, are designated by the same reference numerals in the drawings.

Figure 2:
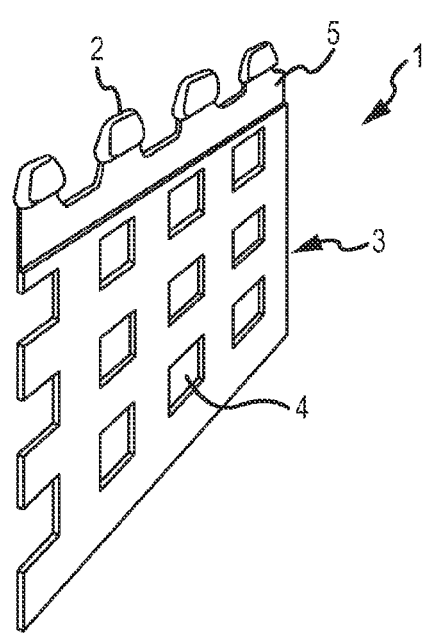
FIG. 2 is a perspective view of the slide fastener element.

FIGS. 1 and 2 show one exemplary embodiment of an inventive slide fastener element 1.

The slide fastener 1, of which FIGS. 1 and 2 merely show a portion, includes a foamable, flexible, band-shaped lattice or grate 3 having a plurality of holes 4. A plurality of slide fastener teeth 2 are secured next to one another, at fixed intervals, on the edge 5 of the lattice 3. The slide fastener teeth 2 are formed by a hard, abrasion-resistant polymeric material in order to ensure a high load capacity. The lattice 3 is here a flexible textile band in which holes 4, shown here as being square or rectangular, the holes being arranged in a lattice-like structure, are produced by a stamping or punching process. The slide fastener teeth 2 are extruded onto the edge 5 of the lattice 3 by means of a known injection molding process, thereby ensuring a reliable securement of the slide fastener teeth 2 on the lattice 3. With regard to its dimensions and the holes 4, the lattice 3 is furthermore in particular designed in such a way that within the framework of a foaming process, it can be reliably anchored in a foam by being foamed in.

Alternatively, the flexible lattice 3 can, for example, also be formed by a perforated foil or very thin sheet, for example a perforated foil of polymeric material. A wire netting, for example, would also be conceivable as the lattice 3.

Figure 3:
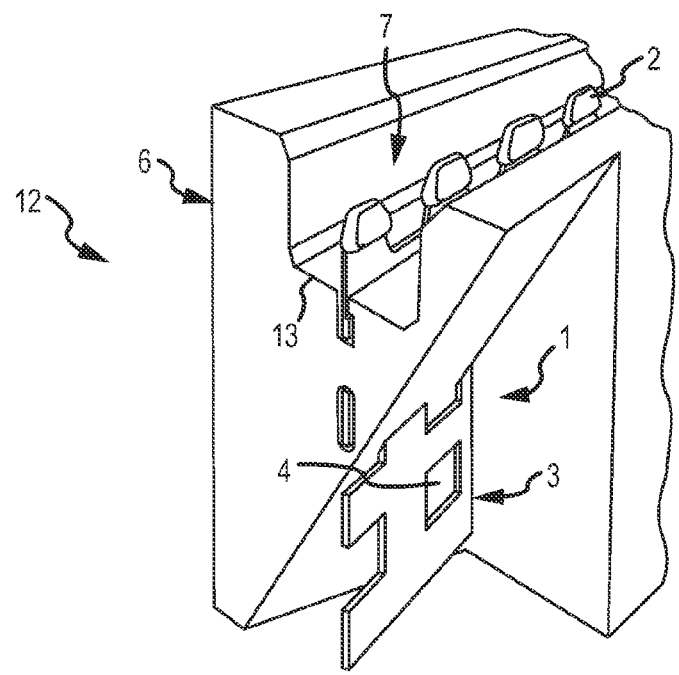
FIG. 3: is a perspective view of a cushion arrangement that includes a slide fastener element.
Figure 4:
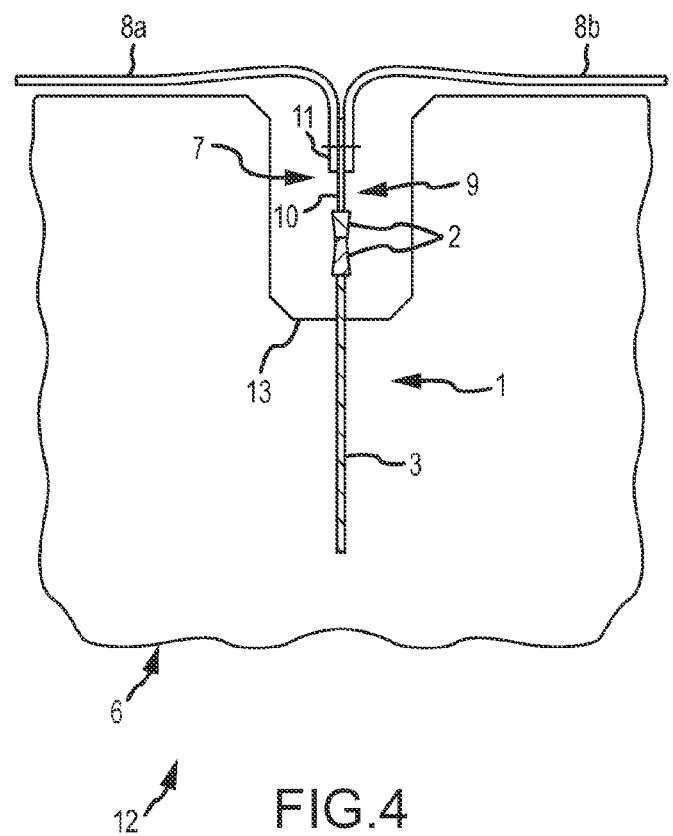
FIG. 4: is a sectional view of the cushion arrangement shown in FIG. 3.

FIGS. 3 and 4 show one exemplary embodiment of a cushion arrangement 12, which includes the slide fastener element 1. The cushion arrangement 12 is here a component of a vehicle seat, for example a seat cushion or a backrest cushion. FIGS. 3 and 4 each illustrate merely a portion of the cushion arrangement 12.

In addition to the slide fastener element 1, the cushion arrangement 12 includes a cushion 6, a two-part cover comprised of the cover parts 8a, 8b, and a slide fastener counter element 9. The slide fastener element 1 and the slide fastener counter element 9 form a slide fastener together with a non-illustrated slider via which the slide fastener teeth 2 of the slide fastener element 1 and of the slide fastener counter element 9 can be caused to interact and can again be released from one another; the cover parts 8a, 8b can be connected with the cushion 6 by means of the slide fastener.

The cushion 6 is provided with an unhook trench or channel 7. The lattice 3 of the slide fastener element 1 is foamed into the cushion 6 in such a way that the slide fastener teeth 2 of the slide fastener element 1 are disposed centrally in the unhook channel 7, projecting somewhat beyond a base 13 of the channel 7. Due to the foaming process, foam penetrates through the holes 4 of the lattice 3, so that the lattice 3, and hence the slide fastener element 1, are securely anchored in the cushion 6.

The slide fastener counter element 9 includes a plurality of slide fastener teeth 2 and a textile band 10, onto the edge of which the slide fastener teeth 2 are sprayed or extruded. At that end of the textile band 10 opposite the slide fastener teeth 2, the slide fastener counter element 9 is sewn via a seam 11 with each of the edge regions of the cover parts 8a, 8b.

By positioning the cover parts 8a, 8b on the cushion 6, and closing the slide fastener by actuating the slider, the cover parts 8a, 8b are reliably fixed in position on the cushion 6. The configuration as a slide fastener enables a high load capacity of this securement. By opening the slide fastener, the cover can be removed from the cushion 6.

Alternatively, instead of a two-part cover, a one-part cover can also be utilized.

The slide fastener element 1 can alternatively also be a one-piece element, for example a one-piece injection molded part or cast part, that includes not only the slide fastener teeth but also the lattice 3.

The slide fastener teeth can alternatively in particular also be formed by a spiral-shaped element, whereby the helical element, in particular a helically bent wire, is secured to the lattice 3.

The specification incorporates by reference the disclosure of German priority document 10 2009 004 321.7 filed Jan. 10, 2009.

The present invention is, of course, in no way restricted to the specific disclosure of the specification and drawings, but also encompasses any modifications within the scope of the appended claims.

What we claim is:

1. A cushion arrangement for a vehicle seat, comprising:
   a foam cushion (6); and
   a slide fastener element (1) that includes a flexible lattice (3) that is capable of receiving foam, wherein said lattice is provided with a plurality of holes (4) and is foamed, such that the foam penetrates completely the plurality of holes (4) and thereby anchors said lattice in said cushion (6), and also includes a plurality of slide fastener teeth (2) secured directly to said lattice (3).

2. A cushion arrangement for a vehicle seat according to claim 1, wherein said lattice (3) is foamed in said cushion (6).

3. A cushion arrangement for a vehicle seat according to claim 1, wherein said cushion (6) is provided with an unhook channel (7) in which are disposed said slide fastener teeth (2) of said slide fastener element (1).

4. A cushion arrangement for a vehicle seat according to claim 1, which further includes a cover (8a, 8b) and a slide fastener counter element (9) that is secured to said cover (8a, 8b), wherein said slide fastener counter element (9) is provided with a plurality of slide fastener teeth (2) adapted to cooperate with said slide fastener teeth (2) of said slide fastener element (1) for a detachable connection between said teeth.

5. A cushion arrangement for a vehicle seat according to claim 4, wherein said slide fastener counter element (9) is provided with a textile band (10) on which said slide fastener teeth (2) of said slide fastener counter element (9) are extruded, and wherein said textile band (10) is connected with said cover (8a, 8b) via a seam (11).

6. A vehicle seat having a cushion arrangement according to claim 1.

7. An interior covering part having a cushion arrangement according to claim 1.

* * * * *